May 21, 1935. B. A. BEAN, JR 2,002,336
WINDSHIELD CLEANER
Filed Oct. 17, 1929
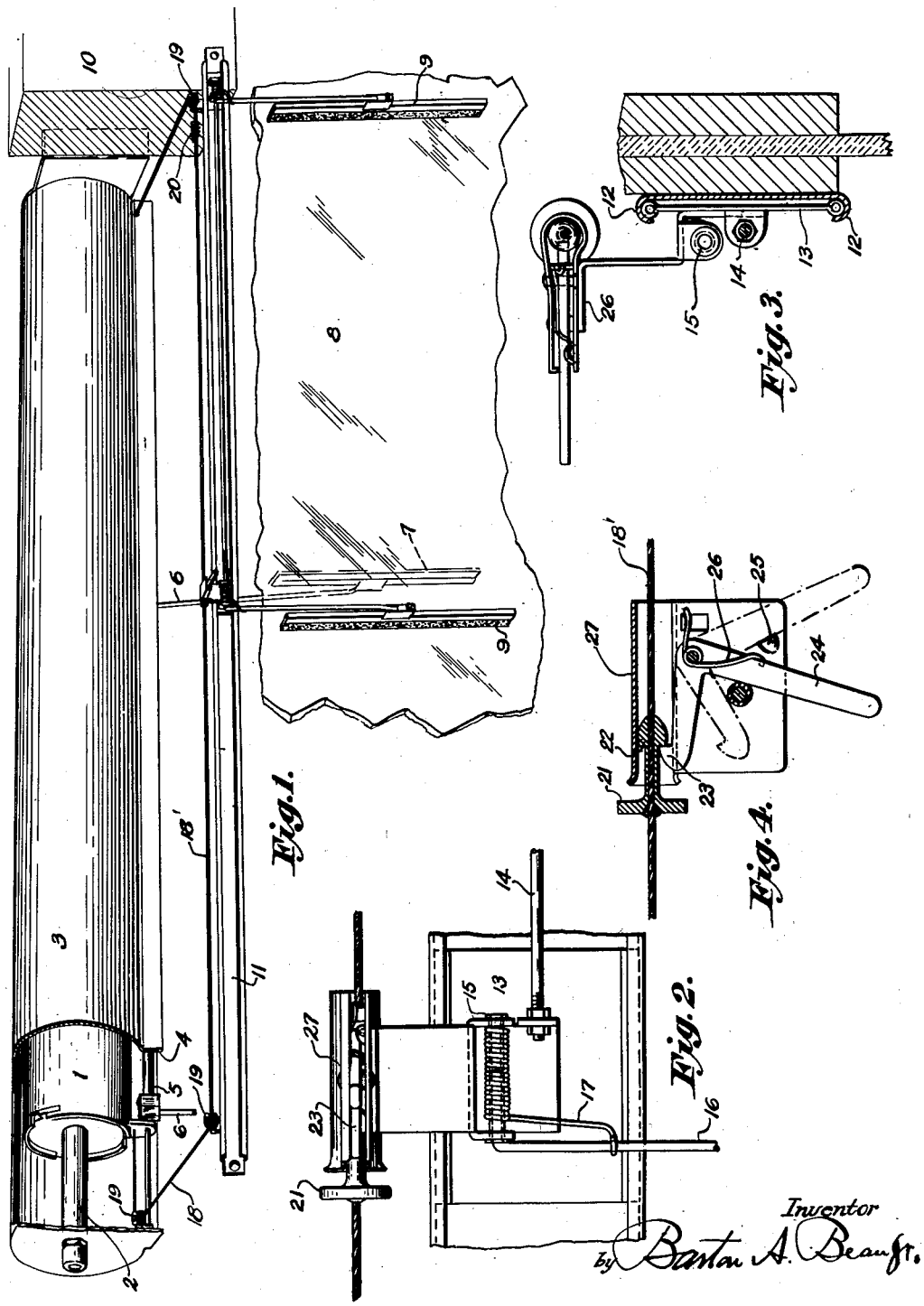
Inventor
by Barton A. Bean Jr.

Patented May 21, 1935

2,002,336

UNITED STATES PATENT OFFICE 2,002,336

WINDSHIELD CLEANER

Barton A. Bean, Jr., Williamsville, N. Y., assignor to Trico Products Corporation, Buffalo, N. Y.

Application October 17, 1929, Serial No. 400,342

12 Claims. (Cl. 15—252)

This invention relates to improvements in the "full-vision" type of windshield cleaners as distinguished from the oscillating wiper type which clears only a restricted area on the windshield for observing traffic conditions while driving during inclement weather. In the generally known electric type, as well as in the preferred fluid-pressure type, such as that disclosed in Patent No. 1,716,135 granted to Henry Hueber on June 4, 1929, the wipers are vertically disposed and travel horizontally to clean the windshield for practically its entire width. Because of this fact this cleaner is much more desired than the oscillating type of windshield cleaner in which the zone or area cleaned is restricted to the arcuate path of the wiper.

At intervals, the inner surface of the windshield glass requires a cleaning of the particles of dust, vapor and other vision-obscuring matter collected thereon. In the oscillating type of windshield cleaner some attention has been given to this interior cleaning, as by mounting an inner wiper to swing coaxially with the outer wiper to thereby clear an inner zone coextensive with that cleaned by the exteriorly mounted wiper. In this oscillating type, the inner wiper is fixed to the oscillating shaft of the outer wiper for movement therewith and is not capable of being rendered inoperative independently of the outer wiper.

The present invention aims to provide a windshield cleaner which will clean practically the entire inner and outer surfaces of the windshield so as to afford an increased, unclouded field of vision.

The invention further resides in the provision of means for disrupting the operation of the interior wiper so that the latter may be parked or remain at rest when the inner surface of the windshield glass does not require cleaning while permitting the outer wiper to continue functioning.

The invention further resides in the structural features and their arrangements and combinations hereinafter more fully described and claimed, reference being had to the accompanying drawing wherein Fig. 1 is a fragmentary perspective view showing a cleaner embodying the present invention and applied to a windshield.

Fig. 2 is a fragmentary elevation showing partly a portion of the inner carriage with its coupling means operatively engaged with the wiper actuating element.

Fig. 3 is a transverse vertical section through the windshield showing the coupler or clutching means and carriage of Fig. 2.

Fig. 4 is a horizontal sectional view through the coupler or clutching element.

Referring more in detail to the accompanying drawing, the windshield cleaner herein depicted, as being representative of the full vision type, embodies a motor construction similar to that set forth in the said patent and may be briefly described as comprising a cylinder 1 slidable back and forth upon the combined atmosphere and suction pipes of which only one is herein illustrated, designated by the numeral 2. A casing 3 houses the cylinder 1 and is provided in its lower side with a slot defined by spaced guide flanges 4. The wiper carriage is indicated by the numeral 5 and supports the spaced wiper-carrying arms 6, on the lower ends of which are carried the wipers one of which is indicated at 7. As the cylinder reciprocates within the casing 3 and simultaneously carries with it the carriage 5, the wiper-carrying arms 6 move their respective wipers back and forth across the right and left portions of the front face of the windshield glass 8.

The present invention incorporates means operable by and during movement of the exterior wiper or wipers for wiping the inner face of the windshield glass. This means preferably has a movement coextensive with the exterior wipers, and in the present form of the invention I have shown a plurality of inner wipers 9 preferably of felt and spaced apart and arranged in wiping contact with the inner face of the glass, with means for actuating these wipers to likewise clean substantially the entire width of the windshield.

Adjacent the header bar or top frame member of the windshield, indicated at 10, I have shown a track 11 on which operates an inner wiper carriage and which may comprise upper and lower, concave rails 12, the carriage illustrated comprising spaced trucks or members 13 coupled together, as by a rod 14, with the trucks 13 having riding engagement with the rails 12 with or without anti-friction means. The inner carriage (13, 14) is provided with spaced bearings 15 in which the supporting arms 16 for the inner wipers 9 are engaged and resiliently urged against the inner face of the glass 8, as by the springs 17.

The inner carriage is coupled for movement with the outer carriage 5 so that the movement of the motor cylinder 1 will be transmitted or imparted to the inner carriage to reciprocate the same, on its track 11, simultaneously with the outer carriage. This transmission or drive for the inner carriage may simply consist of a flexible link or cable 18 trained over suitably arranged guide wheels or pulleys 19 which are so arranged as to define a flight or section 18' of the cable adjacent the track 11 in substantial parallelism therewith.

The cable may embody a resilient portion 20, if desired, to accommodate or take care of any sudden jars or strains. On this flight or section 18' a position determining member or coupling means is fixed for automatically coupling the inner carriage to the cable in a definite relationship to the exterior wiper, the latter usually being fixed to the actuator 1, 18. A simple embodiment of this coupling means comprises a coupler head having spaced engaging parts 21 and 22 between which a detent or coupling element 23 is designed to enter, the detent being arranged on the inner carriage. This coupling element 23 is retractible from between the parts 21 and 22 of the coupling head, as by a lever 24 which may be retained in its inoperative position by engaging behind a stop 25 arranged on a supporting shelf 27 of the inner carriage. A spring 26 may act to hold the coupling element 23 in its operative position and, to coact with the spring in such functioning, the edge of the shelf is provided with a cage portion that encircles the flexible cable 18 so as to prevent sidewise movement of the coupling head away from the element 23, as is clearly shown in Fig. 4. During the reciprocatory movement of the coupling head the parts 21 and 22 will alternately function to act on the coupling element 23 to impart like reciprocatory motion to the inner carriage.

In operating the improved windshield cleaner, the cylinder 1 is set in operation as by establishing communication between the interior thereof with a source of low pressure, such as the intake manifold of the motor vehicle engine. As the cylinder 1 reciprocates and imparts like movement to its directly carried wiper arms 6, the cable 18 will also be reciprocated back and forth over its guide pulleys 19, and the coupler head 21, 22 will be reciprocated adjacent the track 11 at the inner side of the header bar 10. When it is desired to couple the inner carriage for movement so as to effect cleaning of the inner face of the glass the driver of the motor vehicle will disengage the lever 24 from its stop 25 and permit the spring to move the coupling element 23 into the path of the coupler head and therefore, if the head is not so disposed as to be immediately engaged by the detent when said head does move into the cage portion of the shelf 27, it will depress the element 23 until the part 22 passes thereby whereupon the spring 26 will return the element 23 to its projected position where it will couple the inner carriage to the cable 18 for movement therewith. By reason of the fixed position of the coupler head on the portion 18' of cable 18 the inner wiper will always become coupled therewith in the same spaced relationship to the exterior wiper and when so coupled will always clean the same area of the windshield glass and thereby avoid injury to either the cleaner mechanism or the interior wiper through an improper spaced relationship. When it is desired to discontinue the use of the inner wipers the coupling element 23 is retracted by manipulating the lever 24 until it engages back of stop 25 where it remains until again moved to a coupling position, and if the inner carriage is not already disposed, or parked, at the right hand side of the windshield it may be moved laterally on the track 11 to one side of the direct line of vision of the driver as by part 21 engaging the cage portion of shelf 27.

What is claimed is:

1. A windshield cleaner comprising an endless actuator, spaced supports about which the actuator operates, means for reciprocating the actuator, an exterior wiper, an interior wiper, said wipers being disposed for acting respectively on the outer and inner surfaces of a windshield glass, means securing one of said wipers to the actuator for being moved thereby back and forth on one side of the windshield glass, and means detachably coupling the companion wiper to the actuator for being moved by the latter back and forth on the opposite side of the windshield glass, said coupling means comprising a position determining member fixed to said actuator at a point spaced from said one of said wipers and movable back and forth with the latter, and a coacting member connected to said companion wiper and automatically engageable with said position determining member in definitely spaced relation to said secured wiper, whereby said companion wiper will always be coupled to the actuator definitely spaced from said secured wiper to insure said wipers cooperating to clean predetermined surface portions of the windshield glass.

2. In a windshield cleaner structure for wiping outside and inside surfaces of a windshield glass, a pair of wipers, means for guiding said wipers in cleaning movements in opposed relation across the opposite surfaces of said glass, means for actuating said wipers simultaneously, said means including an endless actuator, a wiper actuating coupler head fixed on said actuator means, a coupler element associated with one of said wipers and automatically engageable with said coupler head for movement therewith, means for connecting said endless actuator to the other wiper, and means operable to disengage said coupler element from said coupler head, whereby said wiper associated with said coupler element becomes inoperative and the other of said wipers continues to operate.

3. In a windshield cleaner structure for wiping outside and inside surfaces of a windshield glass, a pair of wipers, means for guiding said wipers in rectilinear cleaning movements across the surfaces of said glass, means for actuating said wipers simultaneously, said means including a coupler head fixed on said actuating means, a coupler element associated with one of said wipers and engaging said coupler head for movement therewith, means for connecting the other wiper to the actuating means, means operable to disengage said coupler element from said coupler head, a stop for maintaining said means in a disengaged position, and means on said coupler element engageable by said coupler head, whereby when said wiper associated with said coupling element is rendered inoperative and the actuating means continues to operate, said inoperative wiper is moved to a parked position.

4. A reciprocatory cleaner for a windshield glass comprising a wiper means operably mounted for rectilinear reciprocatory movement across said glass, means for reciprocating said wiper means, a coupler head fixed on said reciprocating means, said coupler head having a pair of spaced shoulders, a coupling means associated with said wiper and having a coupling part automatically engageable between said shoulders to connect said wiper to said coupler head in a definite relationship to said reciprocating means for reciprocatory movement therewith, means operable to disengage said part from said coupler head to render said wiper inoperative, and parking means on said coupling means engageable with one of said shoulders, whereby when said coupling part is disengaged from said coupler head during movement of said reciprocatory means said shoulder engages said parking means and moves said wiper to a parked position.

5. In a windshield cleaner structure for wiping a windshield glass, a pair of rectilinearly movable wiper means, operating means connected to one wiper means for actuating it in its rectilinear movement, said operating means and the other wiper means having automatic coupling means associated therewith for automatically coupling said other wiper to the operating means by and during movement of said operating means when said coupling means is in a coupling position, said coupling means including mechanism selectively adjustable into and out of coupling position.

6. A cleaner for a windshield glass comprising a rectilinearly movable mechanism, wiper means rectilinearly movable across the windshield glass, means for supporting part of the wiper means in the path of movement of part of said mechanism, said mechanism and wiper means having means operatively connected thereto for automatically coupling said wiper means to said rectilinearly movable mechanism by and during rectilinear movement thereof and in a predetermined relation thereto whenever said coupling means is in a coupling position, means for positioning said coupling means in an automatic coupling position, and means operably connected to the coupling means for maintaining the latter in said coupling position.

7. A cleaner for both surfaces of a windshield glass comprising a reciprocable mechanism, a pair of wiper means, one of said wiper means being operably connected to said reciprocable mechanism for movement therewith across one surface of the windshield glass, the companion wiper means being movable across the other surface of the windshield glass, said reciprocable mechanism and companion means having inter-engageable coupling means thereon for automatically coupling the companion wiper means to said reciprocable mechanism by and during movement thereof in a predetermined relation thereto whenever said coupling means is in a coupling position, said reciprocable mechanism including means responsive to movement of the latter and movable into contact with and to park said companion wiper means whenever said coupling means is in an uncoupled position, and means for selectively adjusting the coupling means into or out of coupling position.

8. In a windshield cleaner, a rectilinearly movable part, a wiper actuating member secured to said part and movable in response to rectilinear movement of the latter, means for guiding said actuating member, rectilinearly movable wiper means operably mounted adjacent said actuating member for rectilinear movement therewith, means for guiding said wiper means in its rectilinear movement, said actuating member and wiper means carrying coupling means for automatically coupling said wiper means to said actuating member in a predetermined relation thereto by and during movement of said part and member whenever said coupling means is in a coupling position, said coupling means including a coupling element movable from an inoperative position to an operative coupling position and movable in the path of movement of the coupling means portion carried by said actuating member whereby said element automatically couples the wiper means to the actuating member.

9. In a windshield cleaner, a rectilinearly movable part, a wiper actuating member secured to said part and movable in response to rectilinear movement of said part, means for guiding said actuating member, rectilinearly movable wiper means operably mounted adjacent said actuating member for rectilinear movement therewith, means for guiding said wiper means in its rectilinear movement, said actuating member and wiper means carrying interengageable coupling means for automatically coupling said wiper means to said actuating member in predetermined relation thereto by and during movement of said part whenever said coupling means is in a coupling position, said coupling means including a coupler head located in the path of movement of the coupling means portion carried by said wiper means and secured to said actuating member in a definite relation thereto, and a coupling element included in said coupling means and movable from a coupling position to an uncoupling position whereby in said latter position said coupler head engages said wiper means and moves it to a parked position.

10. In a windshield cleaner structure for wiping the surfaces of a windshield glass, an interior wiper for cleaning the inner windshield glass surface, an exterior wiper for cleaning the outer windshield glass surface, actuating means for operating the one wiper independently of the other wiper, means for supporting the actuating means, said actuating means and said other wiper having engageable mechanism parts automatically operable to couple said other wiper to the actuating means by and during movement of the latter and in predetermined spaced relation to said one wiper for concurrent operation therewith whereby during the coupled relation of said other wiper to the actuating means the predetermined spaced relation remains between the inner and outer wipers throughout their concurrent movements in cleaning the inner and outer surfaces, respectively, of the windshield glass.

11. In a windshield cleaner structure for wiping the surfaces of a windshield glass, an interior wiper for cleaning the inner windshield glass surface, an exterior wiper for cleaning the outer windshield glass surface, means for guiding each wiper in rectilinear movements over the inner and outer surfaces of the windshield glass, operating means for operating the one wiper independently of the other wiper, means for supporting said actuating means, said actuating means and said other wiper having engageable mechanism parts automatically operable for detachably coupling said other wiper to the actuating means by and during movement of the latter in predetermined spaced relation to said one wiper for concurrent operation therewith, whereby during the coupled relation of said other wiper to the actuating means the predetermined spaced relation remains between the inner and outer wipers throughout their concurrent movements in cleaning the inner and outer surfaces, respectively, of the windshield glass.

12. In a windshield cleaner structure for wiping inside and outside surfaces of a windshield glass, an interiorly disposed wiper, and exteriorly disposed wiper, a flexible mechanism movable in a predetermined path for automatically actuating the two wipers on their respective sides of the windshield glass, means for supporting said flexible mechanism, means for moving said mechanism in its predetermined path, connecting means for operably connecting one wiper to said mechanism, automatic means detachably connecting the other wiper to said mechanism, said automatic means including a wiper actuating part definitely positioned on said flexible mechanism for movement therewith, and a cooperating member connected to said other wiper for automatic coupling engagement with said part by and during movement of the latter, whereby said other wiper upon automatic coupling with the actuating part remains coupled with the latter in a definite relation with respect to said one wiper for coaction in cleaning opposite sides of the windshield.

BARTON A. BEAN, Jr.